July 19, 1960  C. GARDNER, JR  2,945,595
CLOTHES HANGER
Filed Jan. 3, 1958
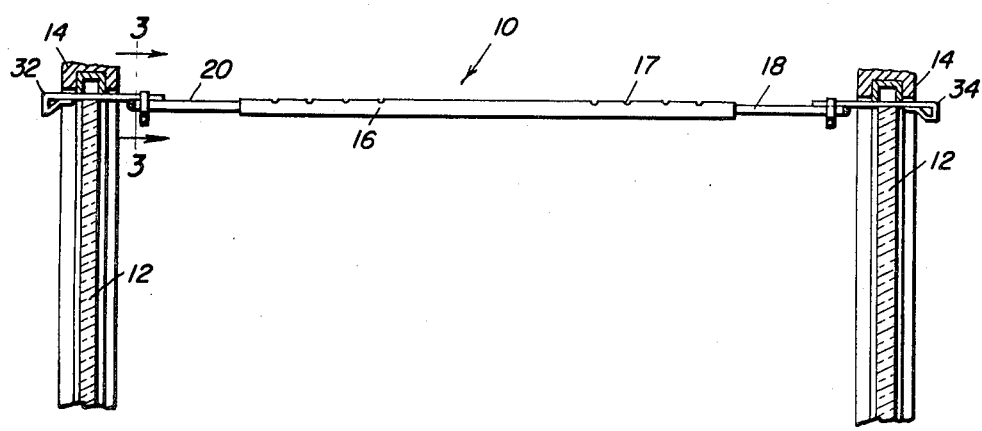
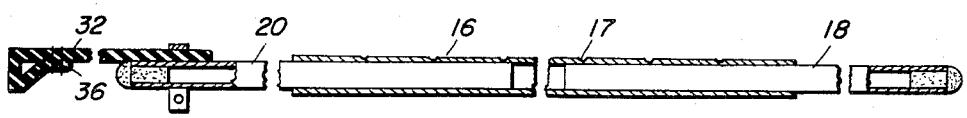
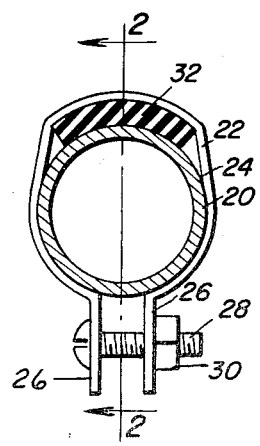
Charles Gardner, Jr.
INVENTOR.
BY *Clarence A. O'Brien*
*and Harvey B. Jacobson*
Attorneys

# United States Patent Office 2,945,595
Patented July 19, 1960

2,945,595
CLOTHES HANGER
Charles Gardner, Jr., 119 W. 23rd St., Owensboro, Ky.
Filed Jan. 3, 1958, Ser. No. 707,008
2 Claims. (Cl. 211—105.3)

This invention relates to clothes hangers and more particularly for a novel type of clothes hanger to be utilized over the rear seat of an automobile.

It is the principal object of this invention to provide a novel pole type clothes hanger for utilization above the rear seats of automobiles which is adaptable for all widths of cars and which is relatively inexpensive and reliable.

It is a further object of this invention to provide an adjustable pole type clothes hanger for an automobile which will be supported by the rear windows of an automobile but which will however not subject the windows to extreme stresses characteristic of prior type hangers.

It is a further object of this invention to provide an adjustable pole type clothes hanger for an automobile which may be easily disassembled and stored or of course easily assembled for operation.

In accordance with the above stated objects, below is described an adjustable pole type clothes hanger for utilization over the rear seat of an automobile which includes a telescopically constructed tubular member having rubber straps clamped on either end thereof for insertion between the rear windows and the rear window frame.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is an elevational view of the invention shown in its operating environment suspended between the two rear windows of an automobile;

Figure 2 is a sectional view of this invention taken substantially along the plane 2—2 of Figure 3; and Figure 3 is another sectional view of the top of this invention taken substantially along the plane 3—3 of Figure 1.

With continuing reference to the accompanying drawings the numeral 10 generally represents the clothes hanger of this invention to be utilized between the rear windows 12 of an automobile having frames 14 therearound.

The invention contemplates the use of a central tube 16 constructed preferably of a material such as aluminum tubing having a thickness of an amount adequate to support a substantial amount of clothing. Telescopically related with tube 16 at either end thereof are two extensions 18 and 20 which slidably fit within tube 16. A clamp 22 having a central portion 24 is adapted to closely fit around extensions 20 or 22. The clamp 22 has depending projections 26 thereon which virtually form a fork having aligned apertures therethrough. Mounted within the apertures is a screw 28 which is threadedly engaged with a nut 30 for tightly clamping the clamp 22.

A pair of rubber straps 32 and 34 are folded upon themselves at their end as at 36 where the double portion of the strap is locked together as by sewing or by some adhesive. It is contemplated that these straps be made of rubber but of course other materials would suffice. A single portion of the strap 32 is interposed between the extension 20 and the clamp 22 as is clearly shown in Figure 3. The clamp 22 then locks the strap 32 to the extension 20 by means of the nut and screw 30 and 28 which compress the two portions of the fork or projection 26.

In operation, when it is desired that a large amount of clothes be carried by an automobile, it is convenient that the clothes be kept on conventional type hangers to prevent creasing, etc. The conventional hangers will be suspended from the pole type hanger of this invention while being inserted in the grooves 17 to prevent relative sliding while the automobile is moving. The traveler, or automobile operator will telescopically adjust the length of the pole type hanger of this invention 10 to fit across the rear seat of an automobile. The rubber straps 32 and 34 will be placed above the window and the window will be rolled close to the frame 14. It will clearly be seen in Figure 1 that the rolled back portion 36 of the strap 32 is intended to be placed outside the window to prevent the strap from entering the automobile when weight is applied to the central tube 16. Of course, the importance of this folded back portion 36 of strap 32 cannot be overestimated if the primary objects of this invention, that is to keep the clothes in good condition while travelling, is to be achieved.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A clothes hanger for automobiles comprising a rigid elongated tube including a plurality of telescopically related sections, a pair of flexible straps, each of said straps having a relatively wider portion and a relatively narrower portion, a pair of screw clamps, each of said screw clamps surrounding a terminal section and one of said straps at said narrower portions for maintaining said straps and sections in fixed relationship, said relatively wider portion including a portion sewn back upon itself and grooves formed in said tube for receiving hangers to prevent sliding movement along said tube.

2. A clothes hanger for automobiles comprising a central rigid elongated tube, a pair of tube extensions, each of said extensions terminally and telescopically received in opposite ends of said tube, a pair of flexible straps, each of said straps having a relatively wider portion and a relatively narrower portion, a pair of screw clamps, each of said screw clamps surrounding one of said extensions and one of said straps at said narrower portions for maintaining said straps and extensions in fixed relationship, said relatively wider portion including a portion sewn back upon itself and grooves formed in said tube for receiving hangers to prevent sliding movement along said tube.

References Cited in the file of this patent
UNITED STATES PATENTS

| | | |
|---|---|---|
| 705,295 | Richardson | July 22, 1902 |
| 773,710 | Bronson | Nov. 1, 1904 |
| 1,000,992 | Cooper | Aug. 22, 1911 |
| 1,391,599 | Wood | Sept. 20, 1921 |
| 1,696,128 | Shee | Dec. 18, 1928 |
| 2,478,337 | Strasser | Aug. 9, 1949 |
| 2,483,781 | Perryman | Oct. 4, 1949 |
| 2,547,883 | Olson | Apr. 3, 1951 |
| 2,576,171 | Bratt | Nov. 27, 1951 |
| 2,628,751 | Bain | Feb. 17, 1953 |

FOREIGN PATENTS

| | | |
|---|---|---|
| 1,127,972 | France | Aug. 20, 1956 |